United States Patent
Gleim et al.

(10) Patent No.: US 8,515,063 B2
(45) Date of Patent: Aug. 20, 2013

(54) COORDINATED VIEWING EXPERIENCE AMONG REMOTELY LOCATED USERS

(75) Inventors: William L. Gleim, San Diego, CA (US); Petr Peterka, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 451 days.

(21) Appl. No.: 12/643,263

(22) Filed: Dec. 21, 2009

(65) Prior Publication Data

US 2011/0150214 A1    Jun. 23, 2011

(51) Int. Cl.
    *H04L 29/06*    (2006.01)
(52) U.S. Cl.
    USPC ............................................. 380/200; 726/27
(58) Field of Classification Search
    USPC .................................. 380/200; 726/5, 27–30
    See application file for complete search history.

(56) References Cited

U.S. PATENT DOCUMENTS

| | | | | |
|---|---|---|---|---|
| 6,983,367 | B2 * | 1/2006 | Go et al. | 713/168 |
| 7,003,282 | B1 * | 2/2006 | Ekberg | 455/411 |
| 7,907,953 | B2 * | 3/2011 | Moreillon | 455/453 |
| 8,086,535 | B2 * | 12/2011 | Zweig et al. | 705/53 |
| 2004/0240394 | A1 * | 12/2004 | Cochard et al. | 370/253 |
| 2006/0021062 | A1 * | 1/2006 | Jang | 726/27 |
| 2006/0209740 | A1 * | 9/2006 | Anza Hormigo et al. | 370/328 |
| 2007/0168543 | A1 | 7/2007 | Krikorian et al. | |
| 2008/0317439 | A1 | 12/2008 | Wong et al. | |
| 2009/0069038 | A1 * | 3/2009 | Olague et al. | 455/466 |
| 2009/0198993 | A1 * | 8/2009 | Kim | 713/150 |
| 2009/0249225 | A1 | 10/2009 | Beswick et al. | |
| 2010/0138903 | A1 * | 6/2010 | Medvinsky | 726/6 |

OTHER PUBLICATIONS

"GGF11 Semantic Grid Applications Workshop", Jun. 10, 2004, pp. i-v, and 1-99.

\* cited by examiner

*Primary Examiner* — Ali Abyaneh (57) ABSTRACT

A method of viewing a content item is provided. The method includes receiving an encrypted content item and a network address of a key management system from a primary client device over a communications network. A session key is obtained over the communications network and the primary client device is notified that the session key has been obtained. An encrypted version of a content key is received over the communication network to decrypt the content item and content rights that determine access to the content item. The content rights restrict the content item from being rendered unless it is rendered in coordination with the rendering of the content item by the primary client device. The encrypted version of a content key is decrypted with the session key. The content item is rendered in accordance with the content rights by decrypting the content item with the content key.

26 Claims, 4 Drawing Sheets

COORDINATED VIEWING EXPERIENCE AMONG REMOTELY LOCATED USERS

BACKGROUND

Television programming and other video content are increasingly being delivered to consumers in new ways. For example, the digital video recorder is an example of a device that leverages the flexibility of digital media and its storage to provide a new level of convenience relating to television viewing as well as recording. Also, television programming and a myriad of other multimedia are increasingly finding a home on new devices. For example, television programming is no longer found solely on the television. Through computer networks, as well as other delivery mechanisms, television and other media content are increasingly becoming available on other devices, such as personal computers, mobile phones, PDAs, and other portable computing devices. The broader availability of media on these devices, as well as the inherent flexibility of digital media also provides a host of new ways for consumers to share content with friends, family, as well as the community at large.

One problem that arises when content is shared among users is that it becomes difficult for the content owner to enforce restrictions on the content's dissemination. For instance, if a user downloads a video clip to his or her mobile phone that is protected by a digital rights management scheme, it becomes difficult or impossible for the user to share the content with other users. Even if the content owner allows the user to share the content in a limited manner by transferring limited content rights, the process can be cumbersome for both the user sending the video clip and the user receiving the video clip. On the other hand, if the user downloads a video clip to his or her mobile phone that is not protected by any digital rights management scheme, the user can easily share the clip with others, but the content owner loses the ability to further control its dissemination.

SUMMARY

In accordance with an aspect of the present invention, a method of viewing a content item is provided. The method includes receiving an encrypted content item and a network address of a key management system from a primary client device over a communications network. A session key is obtained over the communications network and the primary client device is notified that the session key has been obtained. An encrypted version of a content key is received over the communication network to decrypt the content item and content rights that determine access to the content item. The content rights restrict the content item from being rendered unless it is rendered in coordination with the rendering of the content item by the primary client device. The encrypted version of a content key is decrypted with the session key. The content item is rendered in accordance with the content rights by decrypting the content item with the content key.

In accordance with another aspect of the present invention, a method of sharing a content item with a secondary client device is provided. The method includes sending an encrypted content item and a network address of a key management system from a primary client device to a secondary client device over a communications network. Notification is received from the secondary client device that a session key has been obtained from a key management system. An encrypted version of the content key used to decrypt the content item and content rights that determine access to the content item is caused to be sent to the secondary client device over the communications network, wherein the session key is configured to decrypt the encrypted copy of the content key and the content rights restrict the content item from being rendered unless it is rendered in coordination with rendering of the content item by the primary client device.

In accordance with yet another aspect of the present invention, a network-enabled client device is provided. The client device includes one or more processors for executing machine-executable instructions and one or more machine-readable storage media for storing the machine-executable instructions. When executed by the one more processors the instructions implement a) a content sharing component for (i) causing an encrypted content item and associated content rights to be communicated over a communications network to other network-enabled client devices so that it can be rendered by the other network-enabled client devices in accordance with the content rights and (ii) causing a decryption key to be provided to the other network-enabled client device that receive the content item. The content rights restrict the content item from being decrypted by the other network-enabled client devices unless it is rendered in coordination with rendering of the content item by the network-enabled client device that causes the content item to be communicated. The instructions also implement a text message component arranged for sending and receiving text-based messages, a user interface arranged to support user interactivity and for presenting the content item to a user, and processing logic. The processing logic is provided to cause the text message component to send a text-based message to one of the other network-enabled client devices that has received the content item indicating that one or more rules specified by the content rights have been satisfied so that the content item can be decrypted by the one other network-enabled client device The rule requires that the content item is being or has been presented at least in part by the user interface.

DETAILED DESCRIPTION

Figure 1:
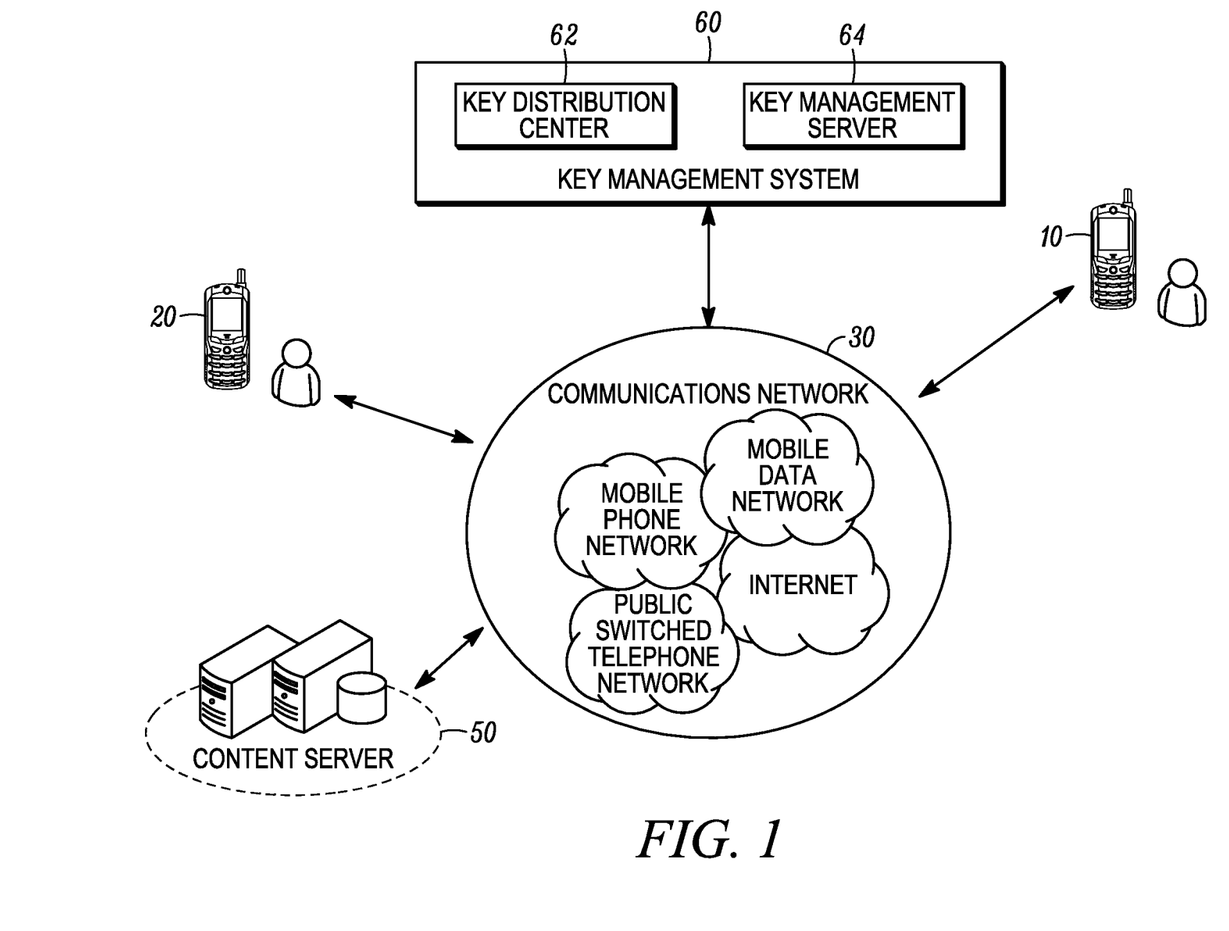
FIG. 1 shows a schematic diagram of one example of an operating environment in which users may share content with one another.

FIG. 1 shows a schematic diagram of one example of an operating environment in which users may share content with one another. The users receive, consume (e.g., view) and distribute content using network-enabled client devices 10 and 20 such as fixed-location or mobile communication devices. For purposes of illustration only the client devices will be depicted as mobile communication devices. Examples of such mobile communication devices include wireless devices such as mobile (e.g., cellular) phones, PCS handset devices, personal digital assistants, portable media players and portable computers (e.g., notebooks and netbooks). The network-enabled client devices may also be set-top boxes (STB), digital video recorders (DVRs), PCs and the like. For purposes of illustration the client device 10 serves as the primary client device which has previously received a content item from a content server 50. The primary client device 10 wishes to share the content item with client device 20, which serves as the secondary client device.

The client devices 10 and 20 communicate with one another over a communications network 30. The communications network 30 may include portions of one or more network types as shown in FIG. 1, including a mobile phone network, mobile data network, public switched telephone network, and the Internet. If the client devices are wireless devices, for instance, they may communicate primarily over mobile phone and data networks. More particularly, if the wireless devices are cellular phones, illustrative mobile networks that may be employed include a 2G radio system such as a GSM (Global System for Mobile Communications), which is based on TDMA (Time Division Multiple Access) technology. In another example, the cellular network is a 3G radio system which is based on a GSM system which utilizes WCDMA (Wideband Code Division Multiple Access) technology or a UMTS (Universal Mobile Telecommunications System), 4G, LTE, WiMax, or WiFi. The client devices may also use the mobile networks to communicate with other networks such as packet-switched networks, including for example, a packet-switched network that operates in accordance with the Internet suite of protocols, and which, as shown in FIG. 1, may generally be referred to as the Internet. Accordingly, communications network 30 may be representative of any number of logically and/or physically distinct networks, which in any individual case may or may not share infrastructure and other resources in whole or in part.

As previously mentioned, sharing video and other content with communities of people is becoming increasingly popular. Web sites which host content uploaded by others for sharing, such as YouTube, are also becoming quite popular. Individuals are often no longer satisfied with merely watching content, they want to participate in the experience and/or share their experience with others. In a common video sharing scenario, a first user sees a video clip or other video source that he or she believes would be of interest to a second user, and correspondingly sends some type of electronic message to the second user. Typically, the message includes a link to the video, or includes the video itself, thereby allowing the second user to view the video. In a PC environment, the procedure may involve the first user sending an e-mail to the second user, where the e-mail includes a URL of the video, or includes the video as a file attachment. Similarly, in mobile communication environments, the procedure may involve the first user sending a message linking to or encapsulating the video, e.g., an MMS message. Moreover, users who wish to share content often wish to consume the content in a coordinated or even simultaneous manner so that they can participate in a shared experience, similar to what they experience when sitting in the same room with friends or family, which allows them to exchange commentary and the like.

When users are allowed to easily share content in the manner described above it is no longer under the control of the content owner, distributor, or the like and thus the content may be freely disseminated without the content owner's approval or authorization. Since in some cases the shared content may only represent a small portion of an entire program, it may be thought that the free dissemination of a single clip does not adversely impact the authorized distribution of the complete program. In fact, the content owner may view the dissemination of such a clip as advertising that may increase demand for authorized copies of the complete program. However, as bandwidth and electronic storage increase in availability, it becomes easier for users to share the entirety of a program, which would decrease demand for authorized copies of the program, thereby decreasing the content owner's potential revenue.

The aforementioned problem can be overcome by employing a digital rights management (DRM) scheme in which the content is encrypted so that it can only be decrypted by authorized users or devices. In this way unauthorized use and distribution of the content can be prevented. The DRM scheme may employ encryption and decryption keys, which are parameters used by encryption and decryption algorithms, respectively. Deploying incorrect keys produces different results during both encryption and decryption. While the DRM scheme may employ public (i.e., asymmetric) key cryptography or secret (i.e., symmetric) key cryptography, for purposes of illustration the DRM scheme will be depicted herein as employing public or asymmetric key cryptography.

The DRM scheme that is used may employ any of a variety of different key management protocols. For instance, in some implementations the well-established Kerberos protocol may be employed, in which tickets are exchanged between the key management server 60 and the secondary client device 20. In other implementations, instead of a Kerberos protocol, another key management protocol that may be employed and which also uses tickets is shown in U.S. Pat. No. 7,243,366, which is hereby incorporated by reference in its entirety, and which is referred to as the IPRM (Internet Protocol Rights Management) system.

The DRM scheme that is employed may also enforce access and copy protection rules specified by the content owner or service provider, such as (1) view only, no copy, (2) time-limited copy, (3) limited number of copies, (4) single copy with no further redistribution, etc. Moreover, the DRM rules may also only allow content to be viewed in a coordinated manner by the primary user who is sharing the content with a secondary user who is receiving the content. For example, the DRM rules may only allow the content to be viewed by the secondary user while it is also being viewed by the primary user. Similarly, the DRM rules may only allow the content to be viewed by the secondary user for a limited period of time after the primary user has begun viewing it. In addition, the secondary user may only be allowed to view the content a limited number of times, and perhaps even only a single time.

In some implementations coordinated viewing between the primary and secondary users can be achieved by the exchange of messages between the users over the communications network 30. For instance, when the primary viewer begins viewing the content a message may be automatically generated by the primary client device 10 and sent to the secondary client device 20. The message may include a timestamp that indicates the time at which the primary user began viewing the content. This message can be used by the DRM scheme in the secondary client device 20 as the authorization that allows the secondary user to begin viewing or otherwise rendering the content. Likewise, if the DRM scheme specifies that the content can only be viewed by the secondary user while it is also being viewed by the primary user, a message can be sent from the primary client device 10 to the secondary client device 20 when, for instance, the primary viewer pauses the content, thereby causing the content to be paused on the secondary client device 20 as well.

The messages exchanged between devices to enforce the DRM rules may employ any suitable protocol. Because of its ubiquity, one convenient message format that may be employed is supported by the short message service (SMS), which is a service available on many communication devices that permits the sending of short messages (also known as text messages) between mobile phones, other handheld devices, computers, and even standard landline phones. Wireless networks generally implement SMS with the use of a short message service center (SMSC), which acts as a store-and-forward system for relaying short messages. Messages are stored in the network until the destination communication device becomes available, so an end user can receive or transmit an SMS message at any time, whether a voice call is in progress or not.

In order to automatically send a message without user intervention whenever the user starts, stops, pauses, fast-forwards, etc., the content, the text message that is generated and sent may be an "invisible" text message. An invisible SMS message, for example, is a short message whose headers are programmed in a particular manner so that the receiving client device acknowledges the receipt of the message and the receiving client device displays no behavior perceptible by the user. One example of a technique for sending an SMS message in an invisible format is shown in U.S. Publication No. 2006/0209740. When the invisible message is received by the secondary client device 20 the content sharing application residing on the device uses the message to enforce the DRM rules that are in place for the content currently being shared.

Instead of an SMS message, other text-based messages may be employed. For instance, MMS messages may be employed, which are supported by the multimedia messaging service developed by 3GPP (Third Generation Partnership Project) for sending multimedia communications between mobile telephones and other forms of wireless information device. Other types of text-based messages that may be employed may be based on any intermediary technology (such as EMS (enhanced message service)) and variants, such as premium SMS, and any future enhancements and developments of these services.

Referring again to FIG. 1, the DRM scheme may be implemented using a key management system 60, which may employ any of a variety of different key management protocols such as those mentioned above. For instance, if a Kerberos protocol is employed, the key management system may co-host a Key Distribution Center (KDC) 62 that issues tickets to the content recipient's client device. The key management system 60 may also co-host a key management server (KMS) 64 that provides the decryption key to the secondary user's client device. Of course, the key management system 60 may or may not be physically as well as logically, divided into a KDC and KMS. As previously mentioned, in some implementations, instead of a Kerberos protocol, another key management protocol that may be employed is the IPRM system.

Figure 2:
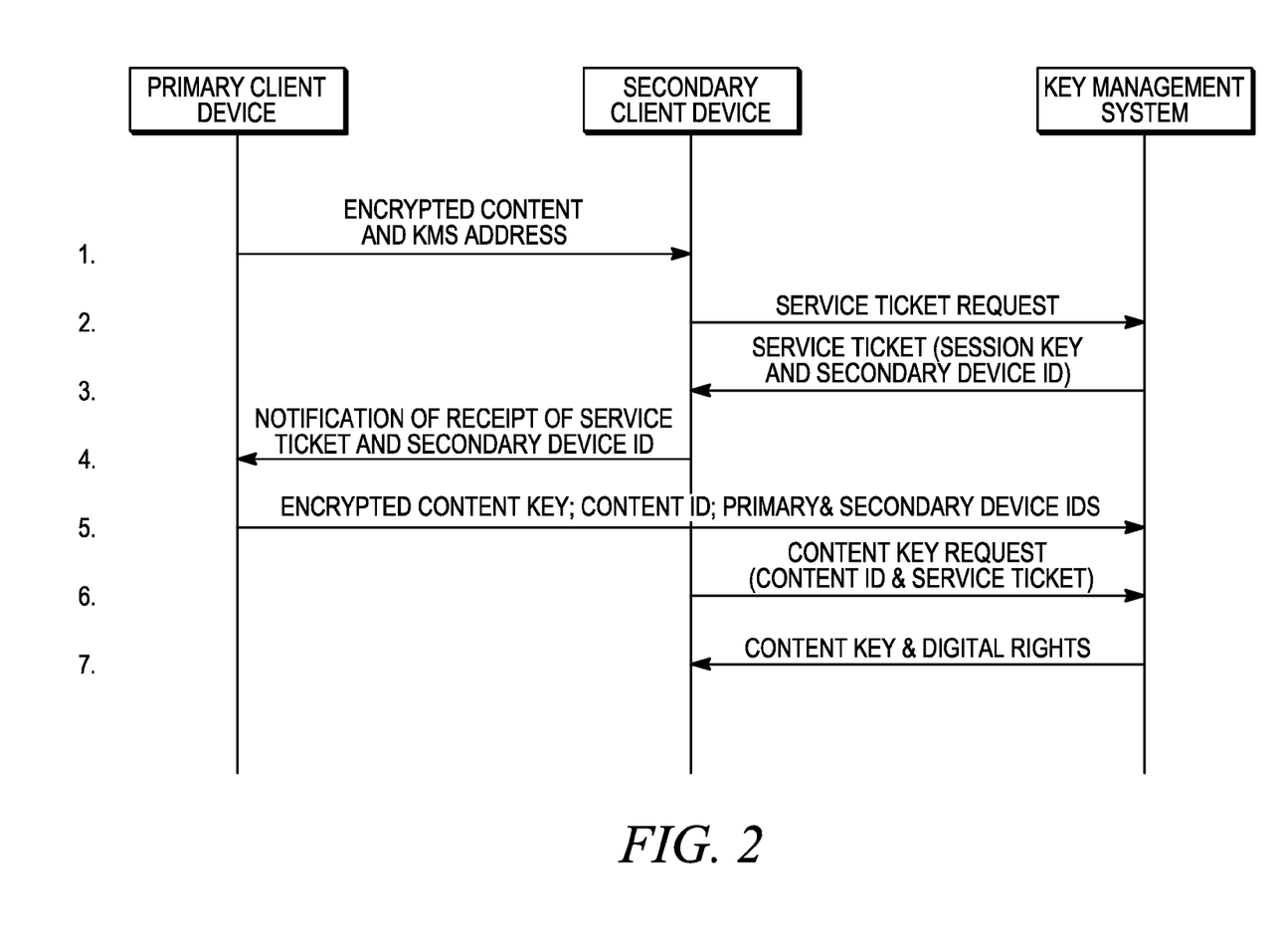
FIG. 2 shows a high-level signaling or call flow diagram illustrating one example of a process by which two users can share and consume content.

FIG. 2 shows a high-level signaling or call flow diagram that will be used to facilitate an understanding of the process by which two users can share and consume content. The signaling diagram shows one example of the interactions between the users' client devices and the key management system 60. As before, in this scenario the client device 10 serves as the primary client device which has previously received a content item from the content server 50. The primary client device 10 wishes to share the content item with client device 20, which serves as the secondary client device.

The content server 50 that distributes the content to the primary client device 10 operates in cooperation with the key management system 60 to control subsequent distribution of the content item by the primary client device 10. For instance, both the content server 50 and key management system 60 may be operated by a common service provider who distributes the content. In this case the key management server may be co-hosted or co-located with the content server 50 in some implementations. In other implementations various contractual relationships may have been previously established between the parties who operate the content server 50 and the key management system 60, whereby the key management system 60 provides DRM services to control and maintain the digital rights to the content residing on the content server 50. It is assumed that the primary device has been provisioned to the Key Management System and has acquired any appropriate tickets needed to gain access to the content that is to be shared with the secondary user. This can be done using the IPRM system or some other suitable DRM or Conditional Access System (CAS).

The process begins when the primary user sends a message (message 1) to the secondary user's client device 20. The message may be in any format, including those discussed above. However, since the message is user generated and is intended to be viewed by the recipient, this message is not in an "invisible" format. The message includes a solicitation asking the secondary user to share a content viewing experience by viewing a content item with the primary user. The secondary user may be, for instance, a social networking contact that is included in the primary user's address book located on the primary client device 10. This message also includes an encrypted content item (including a content ID) and the network address (e.g., fully qualified domain name) of the key management system 60. It should be noted that instead of a single message, the content included in message 1 (as well as in the messages discussed below) may be communicated in multiple messages as appropriate for the particular application. For instance, the solicitation and the content item with the network address of the key management system may be sent in separate messages, with the latter message only be sent upon receiving affirmation from the secondary user that he or she does indeed desire to view the content item.

Next, the client device 20 sends a message (message 2) to the key management system 60, and in particular to key distribution center 62, requesting a service ticket for the Key Management Server (KMS) 64. At this point an optional authentication process may be performed. For instance, the client device may optionally send its digital certificate (e.g., a factory-installed X.509 certificate) to the key management system 60 so that its credentials can be verified.

The key management system 60, and in particular the key distribution center 62, authenticates the secondary user's client device 20. The key distribution center 62 sends a service ticket to the secondary user's client device 20 which includes the secondary device ID and a session key (message 3). The secondary client device 20 responds to the primary client device 10 by sending a message (message 4) which contains the ID that has been assigned to the secondary client device 20. The message serves to notify the primary client device 10 that the secondary client device 20 has received a service ticket.

Once the primary client device 10 is informed that the secondary client device has received a service ticket it sends a message (message 5) to the key management system 60, and in particular the key management server 64. This message includes an ID of the primary client device 10, the secondary device ID 20, and the content ID which identifies the particular content item and the corresponding encryption key that is be shared with the secondary client device 20. In addition, this message (or, as noted above, in a separate message) also includes the encrypted content key that is needed to decrypt the content item to be shared. These messages may use the IPRM key management protocol and may include a ticket that the primary device previously obtained from the KDC 62 for the KMS 64. Other suitable DRM systems may also be used. As a result, the content key has now been securely delivered to the KMS 64.

After notifying the primary client device 10 that it has received a service ticket, the secondary client device 20 sends a key request message (message 6) to the key management center 60, and in particular to the key management server 64, requesting the content key needed to decrypt the content item it received from the primary client device 10. The message includes the content ID of the content item and the previously received service ticket. It should be noted that in some cases key request message 6 may not be necessary. In particular, in some implementations the receipt of message 5 by the key management system 60 may automatically trigger the key management system 60 to send the content key to the secondary client device 20, thereby making the key request message 6 unnecessary.

Upon receiving key request message 6 (or upon receiving message 5 if it serves as the trigger) the key management system 60 sends the secondary client device 20 an encrypted copy of the content key for the specified content item (message 7). In addition, the key management system 60 also sends the digital rights that specify the manner in which the secondary client device 20 can access, copy and distribute the content.

The secondary client device 20 may now decrypt the content key using the session key (or a key derived from the session key) it previously received. The content key is used, in turn, to decrypt the content item so that it may be consumed by the secondary client in accordance with the digital rights it was given. As discussed above, if the DRM rules specify that the content is to be viewed by the secondary user in coordination with the primary user, the secondary user may only begin decrypting and viewing the content when it receives a message (e.g., an invisible SMS message) from the primary user indicating that the primary user has begun rendering the content. In some implementations, however, such a message may be unnecessary. For instance, the receipt of the encrypted content key from the key management system 60 may serve as an implicit indication that the primary user has begun viewing the content.

It should be noted that steps 2-4, in which the secondary client device 20 receives a service ticket and notifies its receipt thereof to the primary client device 10, only needs to be performed a single time for a new secondary client device until the service ticket expires. Upon expiration of the service ticket, the secondary client device 20 will need to repeat steps 2-4.

As previously mentioned, the digital rights provided to the secondary user only allow the content item to be consumed on the secondary client device 20 in coordination with its consumption by the primary user on primary client device 10. Such coordination may restrict the secondary client device 20 so that it can only decrypt the content item after the primary client device has begun consuming the content. Alternatively, or in addition, the secondary user may only be able to consume the content item a single time or a limited number of times (e.g., three times). Also, another rule used in addition to or instead of the aforementioned rules may require the secondary client device 20 to decrypt the content within a limited timeframe, which may in some cases depend on the duration of the content item. For example, the secondary client device 20 may be restricted so that it can only decrypt the content within a timeframe equal to say, the duration of the content item plus an additional 50%. As previously mentioned, consumption of the shared content may be coordinated by the exchange of messages between the primary and secondary client devices.

Figure 3:
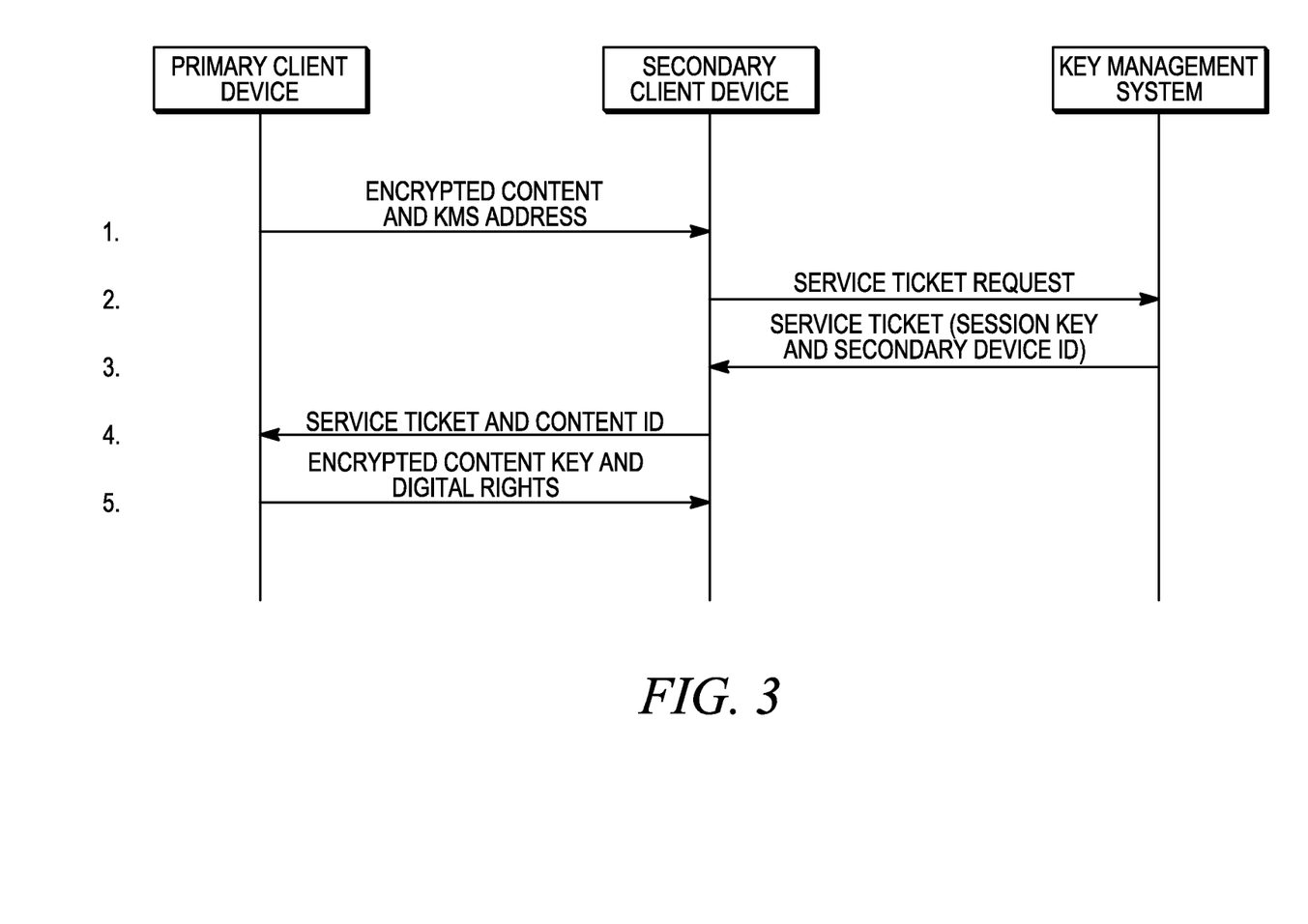
FIG. 3 shows a high-level signaling or call flow diagram illustrating another example of a process by which two users can share and consume content.

In the example presented above in connection with FIG. 2 the secondary client device 20 obtains the content key from the key management system 60. In other implementations, however, the secondary client device may obtain the content key directly from the primary client device 10, thereby eliminating the need for the functionally provided by the key management server 64. FIG. 3 shows a high-level signaling or call flow diagram that describes one example of such an implementation.

Referring to FIG. 3, the process begins when the primary user sends a message with the encrypted content item (including a content ID) and the primary device ID to the secondary user's client device 20. The message also includes the network address (e.g., fully qualified domain name) of the key management system 60. As noted in connection with FIG. 2, instead of a single message, the content included in message 1 (as well as in the messages discussed below) may be communicated in multiple messages as appropriate for the particular application. Next, the secondary client device 20 sends a message (message 2) to the key distribution center 62, requesting a service ticket for accessing content provided by the primary device. At this point an optional authentication process may be performed. For instance, the client device may optionally send its digital certificate (e.g., a factory-installed X.509 certificate) to the key management system 60 so that its credentials can be verified.

The key distribution center 62 sends a service ticket to the secondary user's client device 20 which includes the secondary device ID and a session key (message 3). This process assumes that the primary device has already been provisioned by the KDC 64 and is registered there as a content server. The secondary client device 20 next sends the primary client device 10 a message (message 4) that includes the ID of the content item that is to be shared, as well as the service ticket, which is necessary to obtain the content key from the primary device 10. In response, the primary client device 10 sends a message (message 5) that includes an encrypted copy of the content key for the specified content item. In addition, message 5 (or a subsequent message) also sends the digital rights that specify the manner in which the secondary client device 20 can access, copy and distribute the content.

The secondary client device 20 may now decrypt the content key using the session key it previously received from the key distribution center 62. The content key is used, in turn, to decrypt the content item so that it may be consumed by the secondary client in accordance with the digital rights it was given.

Numerous alternative implementations from those presented above are also possible. For instance, the content item need not be stored on the secondary client device 20. Rather, the content item may be streamed from the primary client device 10 to the secondary client device 20. Moreover, the content item may not even be stored on the primary client device 10. Rather, the content server 50 may stream the content item to both the primary and secondary client devices. One benefit of streaming to both devices is that various user-selected actions such as a request to pause the content item, when performed on one device, can be enforced on the other device without the need to exchange additional messages, thereby increasing in a relatively simple manner the coordinated manner in which the content items is consumed by both users.

In the examples presented above the primary client device 10 shares a content item or items with a single secondary client device 20. In some implementations the primary client device 10 shares a content item or items with multiple secondary client devices in a 1-to-n relation, where n is the number of secondary client devices. The key distribution center 62 can limit the number of secondary client devices with which content items may be shared by issuing a limited number of service tickets, which may be issued, for example, to a group of the primary user's friends. These tickets may be provided with a longer life span in order to maintain the group in a more permanent manner. Alternatively, the tickets may have a short expiration time to create a temporary or ad-hoc sharing relationship. To maintain even more control over the content sharing mechanism, the ticket may have a specific content ID or a list of content IDs in order to control the particular content which may be shared with the secondary devices.

To further enhance the experience of sharing content among users the primary and secondary client devices can both send and receive text-based messages such as SMS or IM messages to one another while the content is being rendering on the client devices. In this way the users can comment on the content in real time while they are experiencing it. If the content being rendered includes images such as video or like, the messages can be displayed as an overlay on the client device display so that both the message and the content can be viewed as the same time.

Figure 4:
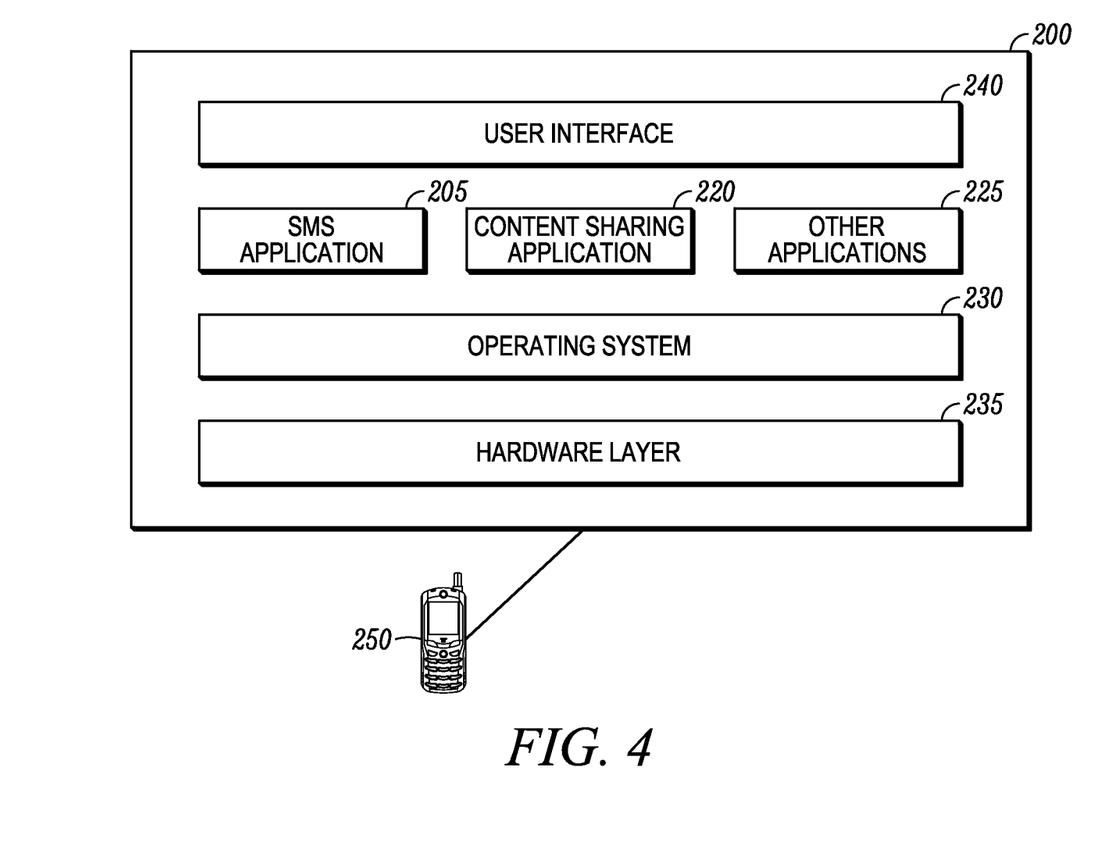
FIG. 4 shows one example of the architecture of a client device.

FIG. 4 shows an illustrative architecture 200 of the major functional components that are used to facilitate the present arrangement and which may be implemented on a client device that is configured as a wireless mobile communication device 250. Although the architecture 200 shown in FIG. 4 is particularly adapted for a mobile phone, the fundamental principles it illustrates can be expected to have general applicability to other platforms. In this illustrative embodiment, an SMS or other text-based application 205 executes on the mobile phone 250 along with a content sharing application 220 that includes a DRM module to protect the content, and other applications as collectively indicated by reference number 225.

Supporting the applications 205, 220, and 225 in the architecture 200 are an operating system 230 and a hardware layer 235. In this illustrative embodiment, the operating system 230 is particularly adapted to operate on a resource-limited device and may comprise, for example, Google Android™ or Microsoft Windows® CE. The hardware layer 235 provides an abstraction of the physical hardware implemented on the device 250 to the operating system 230 and applications 205, 220, and 225 above it. For example, such physical hardware may typically include a processor (e.g., a central processor or "CPU"), system memory such as read only memory ("ROM") and random accessory memory ("RAM"), bus structures, peripheral systems, drives, display devices, user controls and interfaces, etc. The hardware may also include storage media for storing computer-executable instructions (i.e., code) including either or both removable media and non-removable media such as magnetic and optical media, solid-state memory, and other conventional media. A user interface (UI) 240 is also provided by the architecture 200 to support user interactivity and facilitate an effective user experience, and will typically be embodied as a display with a graphical user interface.

The various functional components operating on the wireless communications device 115 may implement various interfaces allowing them to communicate among themselves as necessary. For instance, the SMS application 205 will typically interact with other applications executing on the mobile phone 250 with the use of application programming interfaces (APIs) that are respectively exposed by the other applications. For example, an API which is exposed by content sharing application 220 enables the SMS application 205 to invoke various functions, pass parameters, and exchange data with the content sharing application 220 to coordinate viewing of both the content item and SMS messages that the users exchange with one another. Likewise, an API which is exposed by SMS application 205 enables the content sharing application 220 to invoke various functions. For instance, the content sharing application 220 may use these API's to send invisible SMS messages between the wireless communication devices in order to coordinate the rendering of the content item that is being shared.

The processes described above, including but not limited to those presented in connection with FIGS. 2 and 3 may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable storage medium. The instructions may also be created using source code or any other known computer-aided design tool. A computer readable storage medium may be any medium capable of carrying those instructions and include a CD-ROM, DVD, magnetic or other optical disc, tape, and silicon memory (e.g., removable, non-removable, volatile or non-volatile.

The invention claimed is:

1. A method of viewing a content item, comprising:
receiving an encrypted content item and a network address of a key management system from a primary client device over a communications network by a secondary client device;
obtaining over the communications network a session key by the secondary client device from the key management system;
notifying the primary client device, via the secondary client device, that the session key has been obtained by the secondary client device;
receiving over the communications network an encrypted version of a content key used by the secondary client device to decrypt the content item and content rights that determine access to the content item, wherein the content rights restrict the content item from being rendered unless the content item is rendered after beginning rendering of the content item by the primary client device;
decrypting the encrypted version of a content key with the session key by the secondary client device; and
rendering the content item in accordance with the content rights by decrypting the content item with the content key by the secondary client device.

2. The method of claim 1 further comprising receiving and rendering on the secondary client device a message from the primary client device to be communicated to a user of the secondary device while rendering the content item on the secondary client device.

3. The method of claim 2 wherein the secondary client device is a mobile phone and the message is an SMS, IM or other text-based message received over the communications network.

4. The method of claim 2 wherein the message is overlayed on the content item as the content item is being rendered on a display of the secondary client device.

5. The method of claim 1 further comprising receiving an invisible text-based message from the primary client device to coordinate the rendering of the content item on the primary and the secondary client devices.

6. The method of claim 5 wherein receipt of the invisible text-based message indicates that the primary client device has begun rendering the content item.

7. The method of claim 1 wherein the content rights restrict the content item from being decrypted until after the content item is begun being rendered by the primary client device.

8. The method of claim 1 further comprising receiving from the secondary client device over the communications network a request to render the content item by the secondary client device, wherein the request is for rending the content item by the secondary client device after beginning rendering of the content item by the primary client device, and the secondary client device is associated with a social networking contact identified in an address book located on the primary client device.

9. The method of claim 1 wherein the content rights restrict the content item from being decrypted more than a prescribed number of times.

10. The method of claim 1 wherein the content rights restrict the content item from being decrypted after a prescribed amount of time elapses from when the primary client device begins rendering the content item.

11. The method of claim 10 wherein the prescribed amount of time is based at least in part on a duration of the content item.

12. The method of claim 1 wherein the session key, the encrypted version of the content key and the content rights are received from the key management system.

13. The method of claim 1 wherein the session key is received from the key management system and the encrypted version of the content key and the content rights are received from the primary client device.

14. The method of claim 1 wherein the primary client device is a first mobile communication device and the encrypted content item is received by a second mobile communication device.

15. A method of sharing a content item with a secondary client device, comprising:
sending an encrypted content item and a network address of a key management system from a primary client device to a secondary client device over a communications network by the primary client device;
receiving, by the primary client device, notification from the secondary client device that a session key has been obtained from a key management system; and
causing, by the primary client device, an encrypted version of the content key used to decrypt the content item and content rights that determine access to the content item to be sent to the secondary client device over the communications network, wherein the session key is configured to decrypt the encrypted copy of the content key and the content rights restrict the content item from being rendered unless the content item is rendered after beginning rendering of the content item by the primary client device.

16. The method of claim 15 wherein causing the encrypted version of the content key and the content rights to be sent to the secondary client device includes requesting the key management system to send the secondary client device the encrypted version of the content key and the content rights.

17. The method of claim 15 wherein causing an encrypted version of the content key and the content rights to be sent to the secondary client device includes sending the encrypted version of the content key and the content rights to the secondary client device over the communications network.

18. The method of claim 15 further comprising sending from the secondary client device over the communications network a request to render the content item by the secondary client device, wherein the request is for rending the content item by the secondary client device after beginning rendering of the content item by the primary client device, and the secondary client device is associated with a social networking contact identified in an address book in the primary client device.

19. The method of claim 15 further comprising rendering the content item and, in response thereto, sending, without user intervention, a first message to the secondary client device over the communications network indicating that a rule specified by the content rights have been satisfied so that the content item can be rendered by the secondary client device.

20. The method of claim 19 wherein the first message is an invisible SMS message.

21. The method of claim 19 further comprising sending a second message to the secondary client device over the communications network that is to be rendered by the secondary client device to thereby present a text message to a user associated with the secondary client device.

22. The method of claim 21 wherein the text message is arranged so that the content item is rendered on a display of the secondary client device while the content item is being rendered.

23. The method of claim 15 wherein the content rights only allow the content item to be rendered by the secondary client device while the content item is being rendered by the primary client device.

24. A network-enabled client device, comprising:
one or more processors executing machine-executable instructions; and
one or more non-transitory machine-readable storage media storing the machine-executable instructions, the instructions when executed by the one more processors implementing,
a) a content sharing component for (i) causing an encrypted content item and associated content rights to be communicated over a communications network to other network-enabled client devices so that the content item can be rendered by the other network-enabled client devices in accordance with the content rights and (ii) causing a decryption key to be provided to the other network-enabled client devices that receive the content item, wherein the content rights restrict the content item from being decrypted by the other network-enabled client devices unless the content item is rendered after beginning rendering of the content item by the network-enabled client device that causes the content item to be communicated;
b) a text message component arranged for sending and receiving text-based messages;
c) a user interface arranged to support user interactivity and for presenting the content item to a user; and
d) processing logic for causing the text message component to send a text-based message to one of the other network-enabled client devices that has received the content item indicating that one or more rules specified by the content rights have been satisfied so that the content item can be decrypted by the one other network-enabled client device, the rule requiring that the content item is being or has been presented at least in part by the user interface.

25. The network-enabled client device of claim 24 wherein the content sharing component is arranged to cause the decryption key to be provided to the other network-enabled device in accordance with a Kerberos protocol.

26. The network-enabled client device of claim 24 wherein the content sharing component is arranged to cause the decryption key to be provided to the other network-enabled device in accordance with an Internet Protocol Rights Management (IPRM) system.

* * * * *